(12) United States Patent
Houle et al.

(10) Patent No.: US 9,008,891 B2
(45) Date of Patent: Apr. 14, 2015

(54) TEMPERATURE SENSOR RATIONALIZATION

(71) Applicant: GM Global Technology Operations LLC, Detroit, MI (US)

(72) Inventors: Kevin P Houle, Flint, MI (US); Andrew M. Zettel, Port Moody (CA); Kathryn E Mulligan, Farmington Hills, MI (US); Paul A Adam, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 59 days.

(21) Appl. No.: 13/633,936

(22) Filed: Oct. 3, 2012

(65) Prior Publication Data

US 2014/0095017 A1    Apr. 3, 2014

(51) Int. Cl.
*G01R 31/00* (2006.01)
*B60W 20/00* (2006.01)
*B60W 50/04* (2006.01)

(52) U.S. Cl.
CPC .............. *B60W 20/50* (2013.01); *B60W 50/045* (2013.01); *B60W 2050/041* (2013.01); *B60W 2510/087* (2013.01)

(58) Field of Classification Search
CPC   G01R 31/007; B60C 23/061; B60C 23/0416; G07C 5/085; G01M 17/02
USPC ........ 701/33.9, 34, 22, 102, 41, 2, 36, 37, 58, 701/67, 29.2; 180/65.28, 65.25; 374/119, 374/137, 178, 183, 185, 144, 143; 436/147; 702/65, 33, 60, 63
See application file for complete search history.

(56) References Cited

U.S. PATENT DOCUMENTS

| | | | |
|---|---|---|---|
| 8,428,816 B2* | 4/2013 | Buur et al. ..................... 701/36 |
| 2005/0077368 A1* | 4/2005 | Zak et al. ........................ 237/19 |
| 2008/0181280 A1* | 7/2008 | Wang et al. ...................... 374/1 |
| 2010/0163220 A1* | 7/2010 | Nakajima ..................... 165/202 |
| 2011/0288723 A1* | 11/2011 | Weiss et al. .................... 701/34 |
| 2013/0076381 A1* | 3/2013 | Takayanagi et al. ..... 324/750.03 |
| 2014/0020460 A1* | 1/2014 | Ertz et al. .................. 73/114.55 |

* cited by examiner

*Primary Examiner* — Helal A Algahaim
*Assistant Examiner* — Jelani Smith
(74) *Attorney, Agent, or Firm* — Quinn Law Group, PLLC

(57) ABSTRACT

A method of rationalizing a plurality of temperature sensors associated with a plurality of electrical systems of a vehicle includes: maintaining each of the respective electrical systems of the vehicle in a non-operational state for a predetermined period of time; receiving a temperature reading from each of the plurality of temperature sensors following the predetermined period of time; computing a master-reference temperature value from the plurality of received temperature readings; determining a difference between each of the respectively received temperature readings and the computed master-reference temperature value; comparing each determined difference to a threshold; and providing an indicator if one or more of the determined differences exceeds the threshold.

17 Claims, 3 Drawing Sheets

TEMPERATURE SENSOR RATIONALIZATION

TECHNICAL FIELD

The present invention relates to a method of diagnosing a malfunctioning temperature sensor within a vehicle powertrain.

BACKGROUND

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston-type internal combustion engine (ICE). The internal combustion engine converts chemical energy stored in fuel (gasoline, diesel, bio fuels, natural gas, or other fuels) into kinetic energy through combustion of the fuel mixed with air.

Hybrid vehicles utilize multiple, alternative power sources to propel the vehicle, minimizing reliance on the engine for power. A hybrid electric vehicle (HEV), for example, incorporates both electrical energy and chemical energy, and converts the same into mechanical power to propel the vehicle and power the vehicle systems. The HEV generally employs one or more electric machines (motor/generators) that operate individually or in concert with the internal combustion engine to propel the vehicle. The electric machines convert kinetic energy into electrical energy which may be stored in an energy storage device. The electrical energy from the energy storage device may also be converted back into kinetic energy for propulsion of the vehicle.

During operation, the various components may generate heat through energy conversion and operational inefficiencies. In some instances, the hybrid vehicle powertrain may be capable of a maximum efficiency when operated within a particular temperature range. When the powertrain is colder than desired, viscous friction and temperature-dependent electrical resistances may result in inefficient operation. Conversely, when the powertrain is hotter than desired, components may experience accelerated wear and liquids may be at an increased risk of vaporizing. It is common to use active cooling systems in an attempt to modulate the temperature of the powertrain, as sensed by temperature probes disposed across the various vehicle components.

SUMMARY

A hybrid vehicle powertrain includes a plurality of electrical systems, with each system including a respective temperature sensor, and a thermal control module in communication with each of the respective temperature sensors. The thermal control module is configured to perform a temperature sensor diagnostic routine if each of the respective electrical systems remain in a non-operational state for a predetermined period of time.

The temperature sensor diagnostic routine is configured such that the thermal control module may: receive a temperature reading from each of the plurality of temperature sensors; compute a master-reference temperature value from the plurality of received temperature readings; determine a difference between each of the respectively received temperature readings and the computed master-reference temperature value; compare each determined difference to a threshold; and provide an indicator if one or more of the determined differences exceeds the threshold.

The thermal control module is configured to compute a master-reference temperature value from the plurality of received temperature readings by: determining a median temperature reading from the plurality of received temperature readings; constructing a subset of temperature readings from the plurality of received temperature readings, wherein the subset of temperature readings includes all temperature readings within a predefined temperature range of the median temperature reading; and computing a mean temperature from the subset of temperature readings.

In another configuration, the thermal control module is configured to compute a master-reference temperature value from the plurality of received temperature readings by determining a median temperature reading from the plurality of received temperature readings, such that the master-reference temperature value is the median temperature reading.

In one configuration, the thermal control module is configured to operate an electrical system associated with a temperature sensor in a reduced performance mode if the difference between the temperature reading from the temperature sensor and the master-reference temperature value is greater than the threshold.

Similarly, a method of rationalizing a plurality of temperature sensors associated with a plurality of electrical systems of a vehicle may include: maintaining each of the respective electrical systems of the vehicle in a non-operational state for a predetermined period of time; receiving a temperature reading from each of the plurality of temperature sensors following the predetermined period of time; computing a master-reference temperature value from the plurality of received temperature readings; determining a difference between each of the respectively received temperature readings and the computed master-reference temperature value; comparing each determined difference to a threshold; and providing an indicator if one or more of the determined differences exceeds the threshold.

The above features and advantages and other features and advantages of the present invention are readily apparent from the following detailed description of the best modes for carrying out the invention when taken in connection with the accompanying drawings.

DETAILED DESCRIPTION

Figure 1:
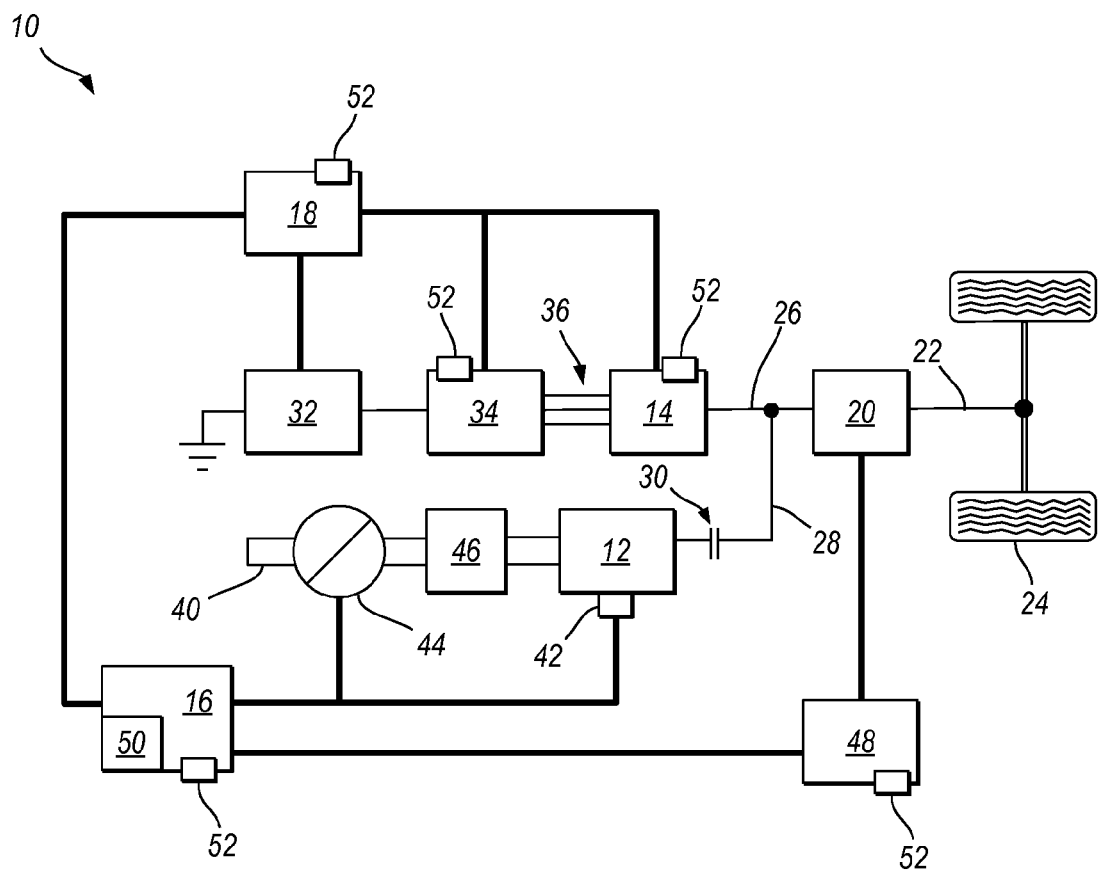
FIG. 1 is a schematic diagram of a hybrid diesel-electric powertrain in communication with an engine control module, transmission control module, and hybrid control module.

Referring to the drawings, wherein like reference numerals are used to identify like or identical components in the various views, FIG. 1 schematically illustrates a hybrid powertrain 10 for a hybrid diesel-electric vehicle. The hybrid powertrain 10 may include an internal combustion engine 12 in mechanical communication with an electric traction motor 14 (electric motor 14). The internal combustion engine 12 may generally be controlled by an engine control module 16 (ECM 16), while the electric motor 14 may generally be controlled by a hybrid control module 18 (HCM 18). The ECM 16 and HCM 18 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. Each module 16, 18 may be configured to automatically perform one or more control/processing routines that may be embodied as software or firmware associated with the module 16, 18.

While FIG. 1 generally illustrates one particular configuration of a hybrid diesel-electric vehicle, other arrangements may be similarly applicable to the presently described technology. Likewise, additional electric motors may be included in various arrangements within the powertrain 10 to serve as the primary movers for the hybrid vehicle. As such, the engine 12 and electric motor(s) 14 may be in power-flow communication with each other and with a transmission 20 to ultimately power a drive shaft 22 and one or more drive wheels 24.

The electric motor 14 may provide one source of torque via a motor output shaft 26. Similarly, the engine 12 may generate torque via a crankshaft 28, which may be selectively coupled with the motor output shaft 26 through a clutch 30 and/or one or more planetary gear sets (not shown). Torque from the crankshaft 28 can be used to directly propel the vehicle 10, and/or to drive the electric motor 14 as a generator to recharge a traction battery 32.

The electric motor 14 may be embodied as a multi-phase permanent magnet/AC induction machine rated for approximately 60 volts to approximately 300 volts or more depending on the vehicle design. The electric motor 14 may be electrically connected to the traction battery 32 via a power inverter module (PIM) 34 and a high-voltage bus bar 36. The PIM 34 may generally be configured for converting DC power to AC power and vice versa as needed. The battery 32 may be selectively recharged from torque applied to the electric motor 14 when that motor 14 is actively operating as a generator, e.g., by capturing energy during a regenerative braking event or when being driven by the engine 12. As may be appreciated, the electric motor 14 may be an electric motor, an electric generator, a motor/generator, or any combination thereof. In some embodiments, such as plug-in HEV (PHEV), the battery 32 may also be recharged via an off-board power supply (not shown) when the vehicle 10 is idle.

The engine 12 may be in fluid communication with an air intake 40 and one or more fuel injectors 42. The air intake 40 may be configured to provide a supply of fresh air to the engine, where the air may mix with the fuel from the fuel injector 42. A variable throttle 44 may controllably modulate the flow of air from the intake 40 to the engine 12, under the direction of the ECM 16. Likewise, the ECM 16 may control the flow of fuel into the engine 12 via the one or more fuel injectors 42. In one configuration, an intake manifold 46 may be disposed between the throttle 44 and the engine 12 to allow the intake are to evenly flow into the engine 12.

In addition to the ECM 16 and HCM 18, the powertrain 10 may further include a transmission control module 48 (TCM 48) that may supervise the operation of the transmission 20. The TCM 48 may be in communication with each of the ECM 16 and HCM 18, and, in an automatic transmission configuration, may aid in coordinating gear changes within the transmission 20. For example, during a gear change, the net torque transmitted through the transmission 20 may desirably be at some predetermined value that is lower than the driver-requested torque. In this manner, the ECM 16 and/or HCM 18 may momentarily override any driver-requested torque commands to facilitate the gear-change in cooperation with the TCM 48.

During operation, the electronics within the ECM 16, HCM 18, TCM 48, PIM 34, and/or electric motor 14 may generate thermal energy (heat) as a product of internal electrical resistances and/or transistor switching. Due to the packaging requirements within the vehicle 10, each component may require various amounts of active cooling to remove the generated thermal energy before it accumulates to a point where electrical circuits begin to degrade. Such active cooling may be provided through a liquid coolant (not shown) that may be selectively pumped through each component to transport the thermal energy to a radiator or other thermal extraction device.

To properly determine the amount of active cooling required (e.g. fluid flow rate), a thermal control module 50 may monitor one or more temperature sensors 52 associated with each respective electrical component (i.e., the ECM 16, HCM 18, TCM 48, PIM 34, and/or electric motor 14). The thermal control module 50 may be embodied in software or firmware associated with the ECM 16, the HCM 18, and/or another such controller.

Throughout the life of the vehicle 10, it may be necessary to perform routine diagnostics on the various temperature sensors 52 to ensure that they are properly functioning and reporting accurate temperatures. Such sensor diagnostics may be embodied as algorithms within the thermal control module 50, and may be configured to dynamically offset sensors that have begun to drift, and/or may provide an indication to disregard readings from inoperable sensors.

Figure 2:
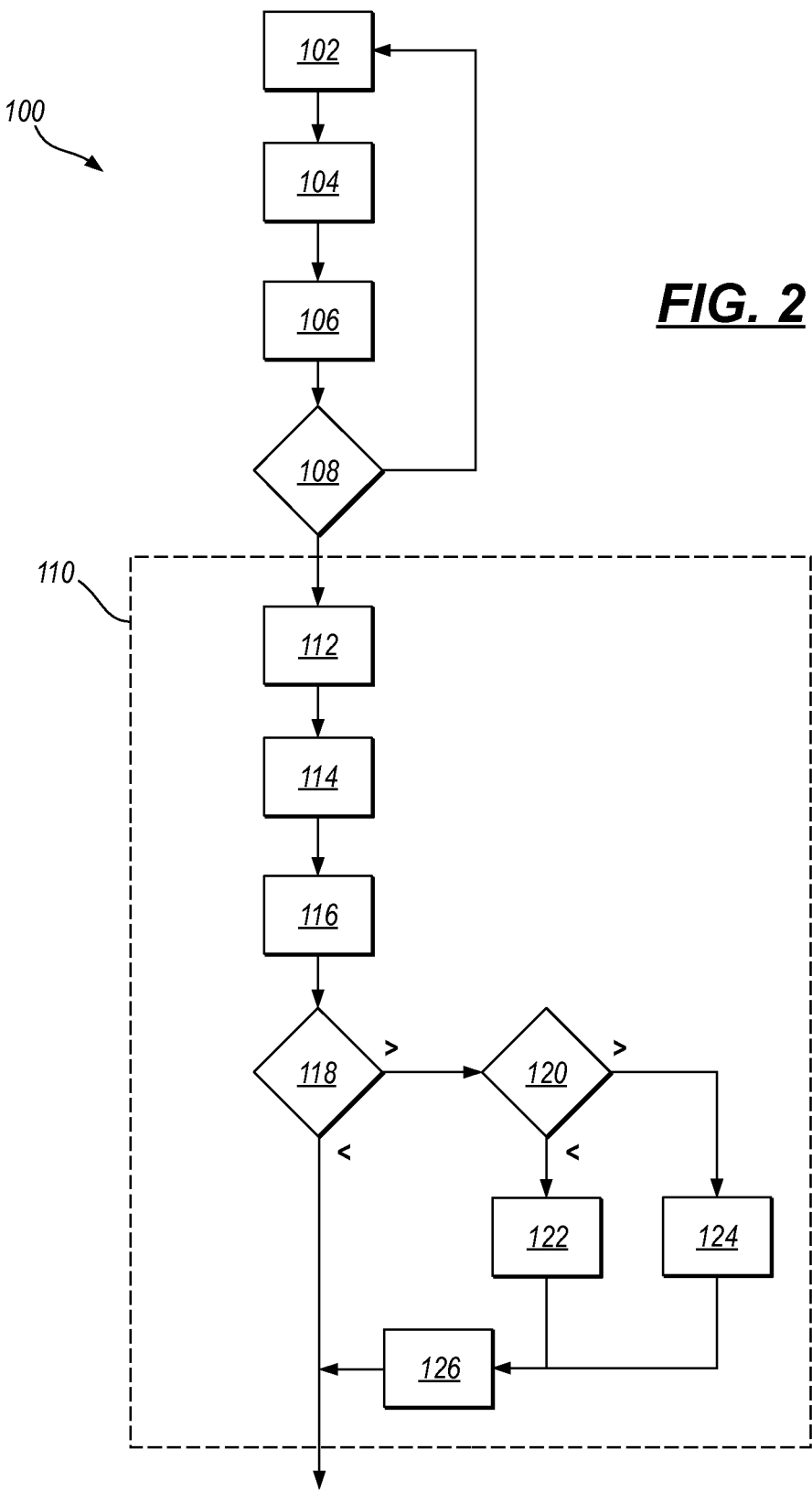
FIG. 2 is a schematic flow diagram illustrating an embodiment of a method for rationalizing a plurality of temperature sensors coupled with electrical systems of a vehicle.

FIG. 2 illustrates a diagnostic method 100 that may be used to evaluate the operation of a temperature sensor 52 associated with an electrical component of the vehicle 10. As will be described in greater detail below, the method 100 generally involves using average temperature readings to infer an operational status. When using such a diagnostic strategy, it is important that the systems under measurement (i.e., the ECM 16, HCM 18, TCM 48, PIM 34, and/or electric motor 14) are all approaching a common temperature so that their respective readings may be reconciled against each other.

Therefore, in step 102, the method 100 may begin when the thermal control module 50 identifies a power-down event where the vehicle is placed into "Park" and/or a "key-off" event occurs (i.e., an operator key is transitioned to an "Off" state). Once the various systems/control modules are de-energized and/or placed into a reduced state of operation (i.e., a non-operational state), the thermal control module 50 may initiate a running timer at step 104. The running timer may be used to track the total amount of time that the vehicle is in the "Off" state.

At step 106, the ECM 16 may detect a key-on event, at which time the various vehicle systems may be energized and brought back up to an operational state. Immediately following the key-on event, at step 108, the thermal control module 50 may compare the count from the running timer to a threshold. If the count is below the threshold the method may restart. Conversely, if the count is above the threshold (i.e., the vehicle has been in a power-off state for longer than a predetermined amount of time), the thermal control module 50 may initiate a temperature sensor diagnostic routine 110.

The predetermined threshold used in step 108 may be selected according to the thermal dynamics of the various vehicle systems such that after the prescribed amount of time, the temperature of all systems under measurement may all trend to a common temperature. In most circumstances, this common temperature may approximate the ambient air temperature external to the vehicle. For example, in one configuration, the predetermined threshold used in step 108 may be approximately 8 hours. Depending on the vehicle configuration, this may be the minimum amount of time required for the various internal components to all cool from an operating temperature to approximately an ambient temperature. It should be noted that while some smaller components may cool more rapidly, others, such as a motor housing, an engine block, various heat sinks, a cooling fluid, etc. may retain more heat for a longer period of time.

Once the temperature sensor diagnostic routine 110 is initiated at step 108 (i.e., each of the respective electrical systems have been maintained in a non-operational state for the predetermined period of time), the thermal control module 50 may initially perform an electrical integrity check on each of the various temperature sensors 52 within the vehicle 10 (step 112). The electrical integrity check may ensure that each temperature sensor is powered on, is neither shorted nor open, and is reporting some temperature reading.

If all sensors are electrically active, the thermal control module 50 may then poll each respective sensor to receive a preliminary temperature reading at step 114. After sitting in an "off" state for a predetermined amount of time, each respective temperature sensor 52 should return a temperature value that is approximately equal to the ambient air temperature. In step 116, the thermal control module 50 may then determine the median of the plurality of temperature sensor readings, which may then serve as a single, master-reference temperature value. As will be described below, the master-reference temperature value may be used to reconcile the readings of each respective temperature sensor, despite those sensors not being necessarily in close physical proximity to each other nor necessarily monitoring the same systems.

Each of the various temperature readings may then be compared to the master-reference temperature value determined in step 116. For example, in step 118, the difference between each respective temperature reading and the master-reference temperature value may be compared to a first threshold. If the respective difference is above the first threshold, but below a second, greater threshold (compared at step 120), an offset may be applied to the temperature sensor that is equal to the difference between the temperature reading and the master-reference temperature value (at step 122). If, however, the difference exceeds the second threshold, that sensor reading may be disregarded, and the sensed system or cooling provided to that system may be operated in a conservative manner to avoid unintentionally overheating the system (at step 124). If the temperature difference between each respective temperature reading and the master-reference temperature value then the reading may be regarded as operational and accurate.

If the difference between the temperature reading of a particular sensor and the master-reference temperature value exceeds the first and/or second thresholds, the thermal control module 50 may provide a warning indicator to the driver of the vehicle (e.g., via a light on an instrument panel), or note the deviation in an on-board diagnostic (OBD) log (at step 126). Such an indication may provide notice to a driver that the vehicle requires service, and/or may alert a trained service technician that a sensor may require further evaluation.

Figure 3:
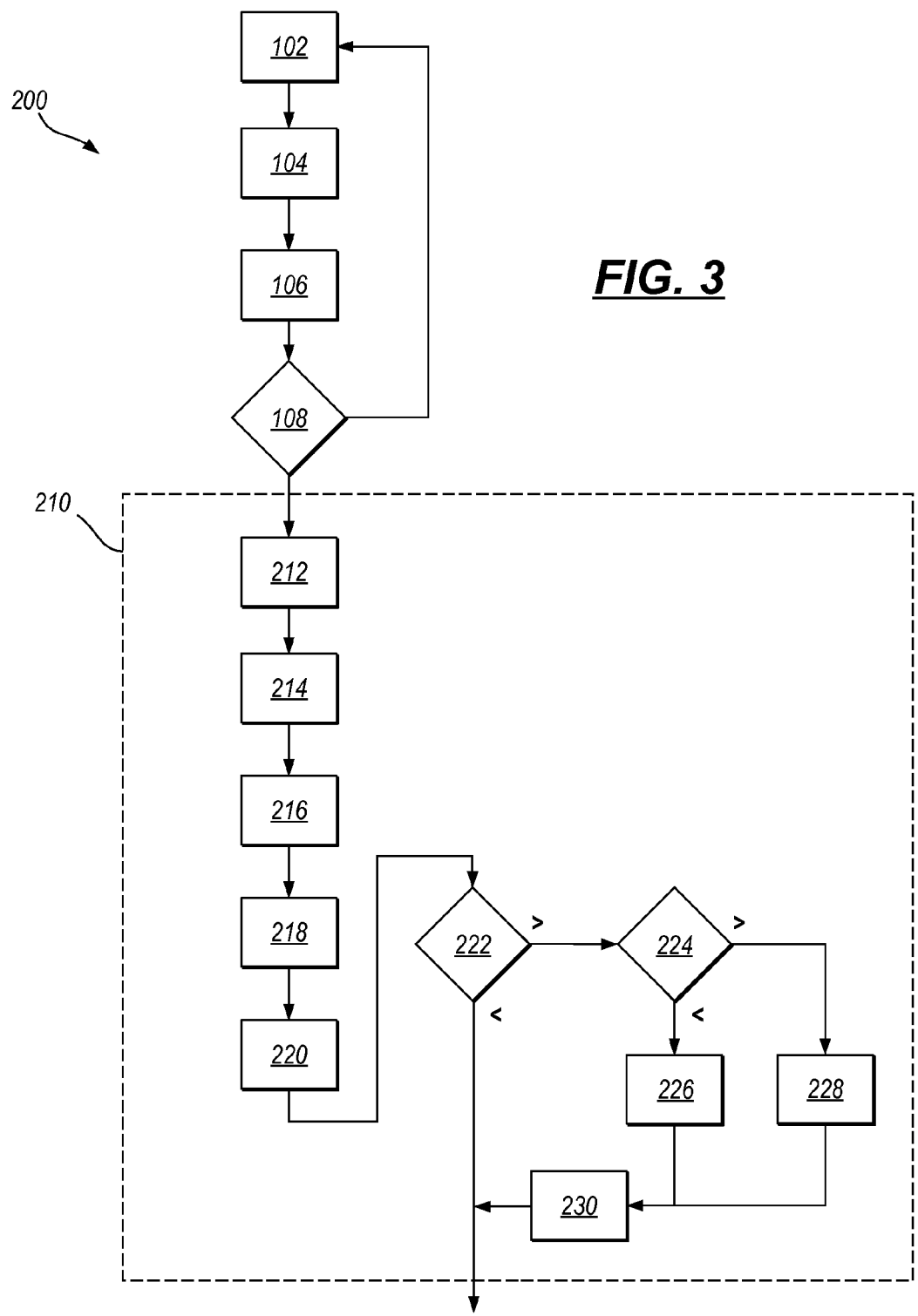
FIG. 3 is a schematic flow diagram illustrating an embodiment of a method for rationalizing a plurality of temperature sensors coupled with electrical systems of a vehicle.

FIG. 3 illustrates a second diagnostic method 200 that may be used to evaluate the operation of a temperature sensor 52 associated with an electrical component of the vehicle 10. Similar to the method 100 illustrated in FIG. 2, the method 200 of FIG. 3 begins at step 102 when the thermal control module 50 identifies a power-down event where the vehicle is placed into "Park" and/or a "key-off" event occurs (as such, all electrical systems may be brought to the non-operational state). The thermal control module 50 may then initiate a running timer at step 104, and eventually detect a key-on event at step 106. Immediately following the key-on event, the thermal control module 50 may compare the count from the running timer to a threshold (step 108). If the count is above the threshold (i.e., the vehicle has been maintained in the non-operational/power-off state for longer than a predetermined amount of time), the thermal control module 50 may initiate a temperature sensor diagnostic routine 210.

Once the temperature sensor diagnostic routine 210 is initiated at step 108, the thermal control module 50 may perform an electrical integrity check on each of the various temperature sensors 52 within the vehicle 10 (step 212). The electrical integrity check may ensure that each temperature sensor is powered on, is neither shorted nor open, and is reporting some temperature reading.

If all sensors are electrically active, the thermal control module 50 may then poll each respective sensor to obtain a preliminary temperature reading at step 214. As described above, after sitting in an "off" state for a predetermined amount of time, each respective temperature sensor 52 should return a temperature value that is approximately equal to the ambient air temperature. In step 216, the thermal control module 50 may then determine the median of the plurality of temperature sensor readings. Using the median temperature, the thermal control module 50 may then perform a separation check (step 218), whereby each temperature sensor reading is compared to the median temperature. If the difference between a temperature sensor reading and the median temperature exceeds a threshold difference, then that particular sensor may be excluded from the collection of sensor readings for subsequent computations. Conversely, if the difference between a temperature sensor reading and the median temperature is less than a threshold difference, that particular sensor may be included in subsequent computations. In one configuration, the temperature threshold used for the separation check may be approximately +/−5 degrees Celsius All sensors that pass the separation check (i.e., are within a predetermined range of the overall median temperature reading) may then be averaged in step 220 to form a master-reference temperature value. Said another way, the master-reference temperature value may be the mean temperature of the subset of temperatures that are within a predefined temperature range of a median temperature of all of the temperature sensors. Such a calculation may be performed after a suitable cold-soak, whereby the temperature of all vehicle systems and temperature sensors are expected to approach a common ambient temperature. The separation check is used to eliminate any sensors from consideration that are not close enough to the presumed ambient temperature to be within normal variance (i.e., some sensor abnormality would then be presumed to cause the abnormal variance). Following the separation check, the averaging of all remaining sensors may generate a statistical average that accounts for the normal variability between the functioning sensors.

Once the master-reference temperature value is determined, each respective temperature sensor readings may be compared to the master-reference temperature value as generally described in FIG. 2. For example, in step 222, the difference between each respective temperature reading and the master-reference temperature value may be compared to a first threshold. If the respective difference is above the first threshold, but below a second, greater threshold (compared at step 224), an offset may be applied to the temperature sensor that is equal to the difference between the temperature reading and the master-reference temperature value (at step 226).

If, however, the difference exceeds the second threshold, that sensor reading may be disregarded, and the sensed system or cooling provided to that system may be operated in a conservative manner to avoid unintentionally overheating the system (at step 228). If the temperature difference between each respective temperature reading and the master-reference temperature value then the reading may be regarded as operational and accurate.

If the difference between the temperature reading of a particular sensor and the master-reference temperature value exceeds the first and/or second thresholds, the thermal control module 50 may provide a warning indicator to the driver of the vehicle (e.g., such as by illuminating a light on an instrument panel), or may note the deviation in an on-board diagnostic (OBD) log (at step 230). Such an indication may provide notice to a driver that the vehicle requires service, and/or may alert a trained service technician that a sensor may require further evaluation.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of rationalizing a plurality of temperature sensors, each of the plurality of temperature sensors being coupled with a respective electrical system of a vehicle, the method comprising:
   receiving an indication of an operator-initiated vehicle power down event, wherein the power down event places each of the respective electrical systems of the vehicle in a non-operational state;
   maintaining each of the respective electrical systems of the vehicle in the non-operational state for a predetermined period of time such that each of the electrical systems cool from a respective operating temperature to a common ambient temperature;
   receiving an indication of an operator-initiated power-on event following the predetermined period of time;
   receiving a temperature reading from each of the plurality of temperature sensors following the operator-initiated power-on event;
   computing a master-reference temperature value from the plurality of received temperature readings;
   determining a difference between each of the respectively received temperature readings and the computed master-reference temperature value;
   comparing each determined difference to a threshold; and
   providing an indicator if one or more of the determined differences exceeds the threshold.

2. The method of claim 1, wherein computing a master-reference temperature value from the plurality of received temperature readings includes:
   determining a median temperature reading from the plurality of received temperature readings;
   constructing a subset of temperature readings from the plurality of received temperature readings, the subset of temperature readings including each temperature reading within a predefined temperature range of the median temperature reading; and
   computing a mean temperature from the subset of temperature readings.

3. The method of claim 1, wherein computing a master-reference temperature value from the plurality of received temperature readings includes:
   determining a median temperature reading from the plurality of received temperature readings; and
   wherein the master-reference temperature value is the median temperature reading.

4. The method of claim 1, wherein maintaining each of the respective electrical systems of a vehicle in a non-operational state for a predetermined period of time includes not providing an artificial source of heat to the respective electrical systems such that the temperature of each of the respective electrical systems is approximately equal to an ambient temperature following the predetermined period of time.

5. The method of claim 1, wherein the predetermined period of time is greater than four hours.

6. The method of claim 1, wherein comparing each determined difference to a threshold includes comparing each determined difference to a first threshold, and comparing each determined difference to a second threshold, the second threshold being greater than the first threshold; and
   further comprising applying an offset to a temperature reading, if the difference between the temperature reading and the master-reference temperature value is greater than the first threshold, and less than the second threshold.

7. The method of claim 6, further comprising operating an electrical system associated with a temperature sensor in a reduced performance mode if the difference between the temperature reading from the temperature sensor and the master-reference temperature value is greater than the second threshold.

8. The method of claim 1, wherein providing an indicator includes illuminating a light on an instrument panel of the vehicle.

9. The method of claim 1, wherein providing an indicator includes noting the determined difference in an on-board diagnostic log.

10. A hybrid vehicle powertrain comprising:
    a plurality of electrical systems, each system including a respective temperature sensor;
    a thermal control module in communication with each of the respective temperature sensors, the thermal control module configured to perform a temperature sensor diagnostic routine following an operator-initiated power-on event if each of the respective electrical systems remain in a non-operational state for a predetermined period of time, wherein the predetermined period of time is sufficient to allow each of the plurality of electrical systems to cool from a respective operational temperature to a common ambient temperature; and
    wherein the temperature sensor diagnostic routine is configured such that the thermal control module:
      receives a temperature reading based upon each of the plurality of temperature sensors;
      computes a master-reference temperature value from the plurality of received temperature readings;
      determines a difference between each of the respectively received temperature readings and the computed master-reference temperature value;
      compares each determined difference to a threshold; and
      provides an indicator if one or more of the determined differences exceeds the threshold.

11. The powertrain of claim 10, wherein the thermal control module is configured to compute a master-reference temperature value from the plurality of received temperature readings by:

determining a median temperature reading from the plurality of received temperature readings;

constructing a subset of temperature readings from the plurality of received temperature readings, the subset of temperature readings including each temperature reading within a predefined temperature range of the median temperature reading; and computing a mean temperature from the subset of temperature readings.

12. The powertrain of claim 10, wherein the thermal control module is configured to compute a master-reference temperature value from the plurality of received temperature readings by:

determining a median temperature reading from the plurality of received temperature readings; and wherein the master-reference temperature value is the median temperature reading.

13. The powertrain of claim 10, wherein the predetermined period of time is greater than four hours.

14. The powertrain of claim 10, wherein the thermal control module is configured to operate an electrical system associated with a temperature sensor in a reduced performance mode if the difference between the temperature reading from the temperature sensor and the master-reference temperature value is greater than the threshold.

15. The powertrain of claim 10, further comprising a light on an instrument panel associated with the vehicle; and wherein the thermal control module is configured to provide an indicator by illuminating the light on the instrument panel.

16. The powertrain of claim 10, wherein the thermal control module is configured to provide an indicator by noting the determined difference in an on-board diagnostic log associated with the hybrid vehicle.

17. The powertrain of claim 10, wherein the plurality of electrical systems includes an engine control module and a hybrid control module.

* * * * *